United States Patent
Heininger et al.

(10) Patent No.: US 11,451,941 B2
(45) Date of Patent: Sep. 20, 2022

(54) POSITION-BASED ACCESS VERIFICATION METHOD

(71) Applicant: Continental Automotive GmbH, Hannover (DE)

(72) Inventors: Franz Heininger, Witzmannsberg (DE); Ulrich Emmerling, Kelheim (DE); Alexander Heinrich, Donaustauf (DE)

(73) Assignee: Continental Automotive GmbH

( * ) Notice: Subject to any disclaimer, the term of this patent is extended or adjusted under 35 U.S.C. 154(b) by 357 days.

(21) Appl. No.: 16/755,087

(22) PCT Filed: Oct. 10, 2018

(86) PCT No.: PCT/EP2018/077566
§ 371 (c)(1),
(2) Date: Apr. 9, 2020

(87) PCT Pub. No.: WO2019/072897
PCT Pub. Date: Apr. 18, 2019

(65) Prior Publication Data
US 2020/0245111 A1     Jul. 30, 2020

(30) Foreign Application Priority Data
Oct. 10, 2018    (DE) ..................... 10 2017 217 978.3

(51) Int. Cl.
*H04W 4/40*       (2018.01)
*H04W 4/029*     (2018.01)
(Continued)

(52) U.S. Cl.
CPC .......... *H04W 4/40* (2018.02); *F02N 11/0807* (2013.01); *G07C 9/00182* (2013.01);
(Continued)

(58) Field of Classification Search
CPC ... H04W 4/40; H04W 4/02–90; H04W 4/022; H04W 4/029; H04W 4/80;
(Continued)

(56) References Cited

U.S. PATENT DOCUMENTS 6,700,475 B1    3/2004   Geber et al.
8,077,011 B2   12/2011   McBride et al.
(Continued)

FOREIGN PATENT DOCUMENTS

CN      103747989 A    4/2014
DE       19912319 C1   10/2000
(Continued)

OTHER PUBLICATIONS

International Search Report and Written Opinion dated Jan. 9, 2019 from corresponding International Patent Application No. PCT/EP2018/077566.
(Continued)

*Primary Examiner* — Ronald Eisner (57) ABSTRACT

An access system for an object with a transmission unit arranged in the object and a transponder unit arranged in a portable device. The transmission unit emits request signals at regular intervals. The transponder unit, in response to a triggering event, stores a current position of the object and determines its own position at regular intervals. The transponder unit deactivates the transmission unit when the transponder unit detects, based on the determined position, that the transponder unit has left a first zone, wherein the first zone is arranged around the object, and wherein the transmission unit does not emit any request signals while the transmission unit is deactivated. The transponder unit furthermore activates the transmission unit when the transponder unit detects, based on the determined position, that the
(Continued)

transponder unit has entered an adjusted first zone, wherein the adjusted first zone is arranged around the object.

15 Claims, 5 Drawing Sheets

(51) Int. Cl.
    *H04W 4/80*     (2018.01)
    *F02N 11/08*     (2006.01)
    *G07C 9/00*     (2020.01)
    *H04W 4/021*     (2018.01)

(52) U.S. Cl.
    CPC ........... *H04W 4/022* (2013.01); *H04W 4/029* (2018.02); *H04W 4/80* (2018.02); *G07C 2009/00206* (2013.01); *G07C 2009/00301* (2013.01)

(58) Field of Classification Search
    CPC ........... F02N 11/0807; G07C 9/00182; G07C 2009/00206; G07C 2009/00301; G07C 2009/00555; G07C 2009/00793; G07C 2209/63; G07C 9/00309; B60R 25/40; B60R 25/245
See application file for complete search history.

(56) References Cited

U.S. PATENT DOCUMENTS

| | | | |
|---|---|---|---|
| 9,008,917 B2 | 4/2015 | Gautama et al. | |
| 2004/0263323 A1 | 12/2004 | Seike et al. | |
| 2005/0024181 A1 | 2/2005 | Hofbeck et al. | |
| 2009/0322469 A1 | 12/2009 | Hammer et al. | |
| 2011/0140926 A1 | 6/2011 | Schraebler et al. | |
| 2012/0092129 A1 | 4/2012 | Lickfelt | |
| 2014/0067161 A1 | 3/2014 | Conner et al. | |
| 2015/0002265 A1 | 1/2015 | Warschat et al. | |
| 2015/0284984 A1 | 10/2015 | Kanter et al. | |
| 2017/0247016 A1* | 8/2017 | Krishnan | G07C 9/00817 |
| 2018/0252794 A1 | 9/2018 | Hermann | |
| 2019/0001927 A1 | 1/2019 | Hermann | |
| 2019/0061689 A1 | 2/2019 | Breer et al. | |

FOREIGN PATENT DOCUMENTS

| | | |
|---|---|---|
| DE | 102004017835 A1 | 12/2004 |
| DE | 102013217010 A1 | 3/2014 |
| DE | 102012222175 A1 | 6/2014 |
| DE | 102013226840 A1 | 6/2015 |
| DE | 102015226631 A1 | 6/2017 |
| DE | 102017103201 A1 | 8/2017 |
| WO | 9936295 A2 | 7/1999 |
| WO | 2008031367 A1 | 3/2008 |
| WO | 2009/095472 A2 | 8/2009 |
| WO | 2017/042030 A1 | 3/2017 |

OTHER PUBLICATIONS

Office Action dated Oct. 29, 2021 from corresponding Chinese patent application No. 201880064187.8.

* cited by examiner

POSITION-BASED ACCESS VERIFICATION METHOD

The invention relates to an access system and to an access verification method, in particular for access verification in a vehicle.

Keyless vehicle access and starting systems, such as for example the Passive Start Entry (PASE) system, are automatic systems for unlocking a vehicle without active use of an automobile key and for starting said vehicle just by actuating the start button. A transmission unit that emits signals at regular intervals is in this case arranged in the vehicle. These are for example electromagnetic signals in the LF (Low Frequency) or HF (High Frequency) band. The signals are received by a transponder unit when it is located in the vicinity of the vehicle, and are subsequently evaluated and/or processed further by the transponder unit. Following the evaluation and/or further processing in the transponder unit, corresponding response signals may be transmitted back again to the transmission unit in the vehicle. The response signals are transmitted for example in the UHF frequency band, and may be evaluated in the vehicle by an evaluation unit. If a response signal is recognized as being correct and hence the transponder unit is recognized as belonging to the vehicle, the vehicle may be unlocked or started. Other functions in the vehicle may also be controlled in this manner.

Such systems are however able to be attacked relatively easily, for example by way of what are known as relay attacks. In addition, the power consumption in the vehicle is high, since the signals have to be emitted from the vehicle at regular intervals, even if there is possibly no valid transponder unit located in the vicinity of the vehicle for a relatively long time. The power consumption of the transponder unit is also high, since the transponder unit always has to be ready to receive and evaluate signals from a vehicle.

The object of the invention is to provide an improved access system and an improved access verification method that better protect a vehicle or another object against unwanted attacks by third parties and in which power consumption is reduced both in the vehicle and in the transponder unit.

This object is achieved by an access system as claimed in claim 1, an access verification method as claimed in claim 12 and a vehicle having an access system as claimed in claim 15. Embodiments and developments of the concept of the invention are the subject matter of dependent claims.

An access system has a transmission unit arranged in an object and a transponder unit arranged in a portable device. The transmission unit is designed to emit request signals at regular intervals in an active state. The transponder unit is designed, in response to a triggering event, to store a current position of the object and to determine its own position at regular intervals. The transponder unit is furthermore designed to deactivate the transmission unit when it detects, on the basis of the determined position, that it has left a first zone, wherein the first zone is arranged around the object, and wherein the transmission unit does not emit any request signals while it is deactivated. The transponder unit is furthermore designed to activate the transmission unit when it detects, on the basis of the determined position, that it has entered an adjusted first zone, wherein the adjusted first zone is arranged around the object.

As a result, it is possible on the one hand to prevent what are known as relay attacks since no request signals are emitted by the transmission unit when the transponder unit, and thus the user, is not in the vicinity of the object. On the other hand, however, it is also possible to save energy since the transmission unit does not emit any request signals for as long as the transponder unit is not in the vicinity of the object. Request signals are usually electromagnetic signals. Generating electromagnetic signals at regular intervals requires a significant amount of energy.

The transmission unit may be designed to transmit a first signal to the transponder unit in the active state in response to the first triggering event. The transponder unit is thereby informed about the triggering event. The transponder unit may store the current position of the object and determine its own position at regular intervals when it has received the first signal from the transmission unit.

The first triggering event may include at least one of locking the object, detecting that all of the doors of the object are closed, and detecting that there are no more people in the object. These events are usually indicators that the user with the transponder unit is moving away from the object.

The transponder unit may furthermore be designed, if it is located within a reception zone, to receive request signals from the transmission unit, to process the request signals and to emit response signals to the transmission unit, wherein the reception zone is arranged around the object and is determined by the range of the request signals. The transponder unit may thereby be recognized as belonging to the object (authentication). If the transponder unit is recognized as belonging to the object, the object may for example be unlocked.

The transmission unit, when it has been reactivated, may furthermore be designed to emit a second signal to the transponder unit in response to a second triggering event. The transponder unit may furthermore be designed to stop the position determination when it receives the second signal from the transmission unit. The position determination in the transponder unit requires energy and therefore loads the battery of the transponder unit. As long as the object is unlocked, it may be assumed that the transponder unit is located within the first zone. Position determination is therefore not necessary during this time.

An outer boundary of the first zone may have a first distance to the object and an outer boundary of the adjusted first zone may have a second distance to the object. In this case, the first distance may be greater than the second distance or the first distance and the second distance may be the same. By choosing the adjusted first zone to be smaller than the first zone, it is for example possible to prevent the transmission unit being deactivated and activated multiple times in succession if the transponder unit is located in the boundary area of the first zone for a relatively long time.

A shape and a size of the first zone and of the adjusted first zone may be variable and depend on at least one parameter. By way of example, the shape and size of the first zone may depend on the accuracy of the position determination by the transponder unit and/or on a current position of the object. The zones are thereby able to be adjusted flexibly to different situations.

The transponder unit may have a multiplicity of components and may furthermore be designed to deactivate at least some of the components if it is detected, on the basis of the determined position, that the transponder unit has left the first zone. The transponder unit may reactivate the components if it is detected, on the basis of the determined position, that the transponder unit has entered the adjusted first zone.

Energy may thereby also be saved in the transponder unit itself, and the battery of the transponder unit is able to be preserved.

The transponder unit may be designed to determine the position of the object when it receives the first signal from the transmission unit. As an alternative, however, it is also possible for the first signal to contain information about the position of the object. The position of the object is thus known to the transponder unit, such that this position is able to be correspondingly stored in the transponder unit.

An access verification method comprises: in response to a triggering event, storing a current position of an object and regularly determining the position of a transponder unit arranged in a portable device; deactivating a transmission unit arranged in the object if it has been detected, on the basis of the determined position, that the transponder unit has left a first zone, wherein the first zone is arranged around the object, and wherein the transmission unit does not emit any request signals while it is deactivated; and activating the transmission unit if it has been detected, on the basis of the determined position, that the transponder unit has entered an adjusted first zone, wherein the adjusted first zone is arranged around the object, and wherein the transmission unit emits request signals at regular intervals while it is activated.

The transmission unit may transmit a first signal to the transponder unit in response to the triggering event. The current position of the object may be stored and the position of the transponder unit may be determined regularly when the first signal has been received by the transponder unit.

The method may furthermore comprise detecting movement of the transponder unit. The transmission unit may be deactivated if it has been detected that the transponder unit has not moved for a predefined duration. The deactivation may in this case take place regardless of whether the transponder unit is detected within or outside the first zone. The transmission unit may furthermore be reactivated if it has been detected that the transponder unit has moved again. This may be expedient for example in cases in which the object is a vehicle and a user parks the vehicle in front of his front door, in front of a shop or a restaurant, etc. It may be the case here that the user, and therefore the transponder unit, is still located in the vicinity of the vehicle and thus possibly also within the first zone. In such cases, the vehicle key usually remains at rest for a relatively long period of time. It is for example hung on a key hook. Deactivating the transmission unit after a certain period of time may prevent unauthorized individuals from stealing the vehicle.

A vehicle has an access system, wherein the access system has a transmission unit arranged in the vehicle and a transponder unit arranged in a portable device. The transmission unit is designed to emit request signals at regular intervals in an active state. The transponder unit is designed, in response to a triggering event, to store a current position of the object and to determine its own position at regular intervals. The transponder unit is furthermore designed to deactivate the transmission unit when it detects, on the basis of the determined position, that it has left a first zone, wherein the first zone is arranged around the object, and wherein the transmission unit does not emit any request signals while it is deactivated. The transponder unit is furthermore designed to activate the transmission unit when it detects, on the basis of the determined position, that it has entered an adjusted first zone, wherein the adjusted first zone is arranged around the object.

The invention is explained in more detail below on the basis of the figures of the drawing, wherein identical or similar elements are provided with the same reference signs. In the figures.

Figure 1:
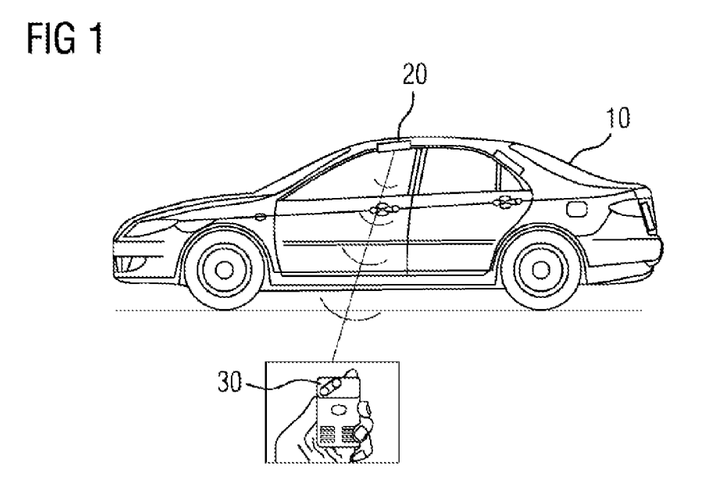
FIG. 1 shows a sketch of the principle of a keyless vehicle access system.

FIG. 1 shows a schematic illustration of the principle of a keyless vehicle access system. A transmission unit 20 that is designed to emit signals is arranged in the vehicle 10. These are for example electromagnetic signals in the LF (Low Frequency) or HF (High Frequency) band. These signals are received by a transponder unit 30 when the latter is located in the vicinity of the vehicle 10, and are subsequently evaluated and/or processed further by the transponder unit 30. Following the evaluation and/or further processing in the transponder unit 30, corresponding response signals may be transmitted back again to the transmission unit 20. The response signals are transmitted for example in the UHF frequency band, and may be evaluated in the vehicle 10 by an evaluation unit which is not illustrated in FIG. 1. The transponder unit 30 may for example be arranged in an electronic vehicle key that the driver of the vehicle 10 carries.

In order to receive the signals transmitted by the transmission unit 20, the transponder unit 30 must be located within a particular radius around the vehicle 10, since signals in the LF and HF bands have only a limited range. This radius may be for example 5 meters or 10 meters. This is however just an example. The range may also be greater or less. The emission of a response signal from the transponder unit 30 to the transmission unit 20 or to an evaluation unit in the vehicle 10 may take place over a greater distance if the response signals are in the UHF frequency band, since these have a greater range.

The transmission unit 20 generally emits signals continuously (at regular intervals). It is thereby ensured that a transponder unit 30 approaching the vehicle 10 is recognized early, such that the authentication is completed and the vehicle 10 is unlocked before a user opens one of the vehicle doors. The vehicle 10 is unlocked when the transponder unit 30 transmits a correct response signal in response to a request signal received from the transmission unit 20.

However, the vehicle battery is loaded due to the continuous emission of request signals by the transmission unit 20. Generating electromagnetic fields requires a certain amount of energy. The vehicle battery may thereby be greatly discharged, in particular in the case of long downtimes.

The battery of the transponder unit 30 is also greatly loaded, since the transponder unit 30 always has to be in an active state (what is known as listening mode) in order to be able to receive and process signals emitted by the vehicle 10 at all times.

Such systems are additionally able to be attacked relatively easily, for example by way of what are known as relay attacks. In this case, it is possible for example for two devices, one of which is located in the vicinity of the vehicle 10 and the other of which is located in the vicinity of the transponder unit 30, to be used to span a greater distance between the vehicle 10 and the transponder unit 30 by virtue of the radio link of the LF (Low Frequency) or HF (High Frequency) communication channel that is used being extended. In this manner, a vehicle 10 is able to be opened and started even though the vehicle key (transponder unit 30) is not located within the necessary range.

Figure 2:
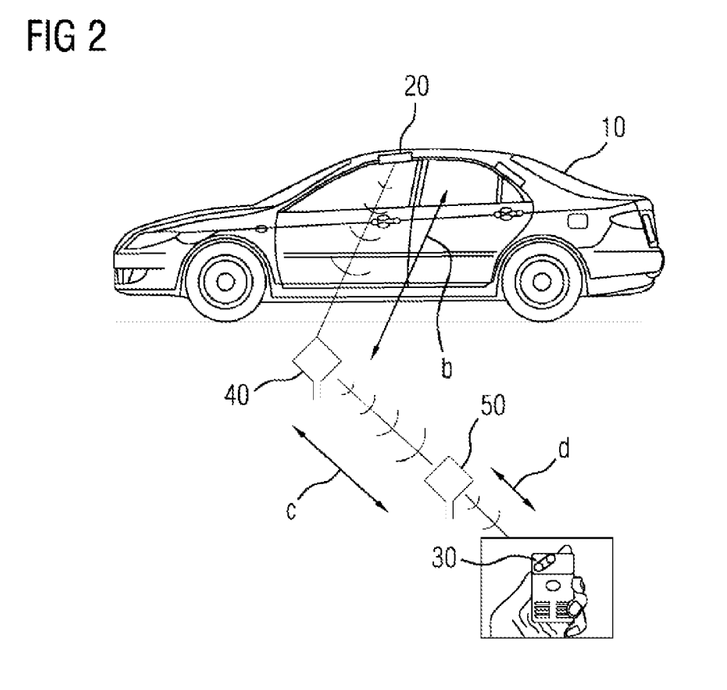
FIG. 2 shows a sketch of the principle of an attack on a keyless vehicle access system, FIG. 3, comprising

FIG. 2 shows a schematic illustration of the principle of such a relay attack on a keyless vehicle access system as a result of extension of the radio link of a communication channel. In the illustration shown in FIG. 2, the key with the transponder unit 30 is located outside the range of the request signals emitted by the transmission unit 20. A first device 40, which has an antenna, is however located in the vicinity of the vehicle 10, within the radius necessary for receiving the signals. The distance between the first device 40 and the transmission unit 20 in the vehicle 10 is denoted by b. A second device 50, which likewise has an antenna, is arranged within the range of the transponder unit 30. The distance between the second device 50 and the first device 40 is denoted by c, and the distance between the second device 50 and the transponder unit 30 is denoted by d.

The first device 40 in the vicinity of the vehicle 10 receives the signals emitted by the transmission unit 20 and forwards them to the second device 50. The signal is in turn transmitted from the second device 50 to the transponder unit 30. In order to be able to transmit the signals over a distance c between the first and second devices 40, 50, which is usually significantly greater than the normal range of LF or HF signals, amplifiers and transmission stages are for example necessary in the devices 40, 50. This arrangement may therefore be used to span a distance of theoretically any size between the vehicle 10 and the key with the transponder unit 30.

In the key, the signal is received, evaluated and/or processed by the transponder unit 30. The response signal emitted thereupon by the transponder unit 30 may be transmitted back to the vehicle 10 again using the same arrangement with the first and second devices 40, 50. The evaluation electronics arranged in the vehicle 10 therefore initially do not detect that the key is not located within the range. Although the key is not within the range, the vehicle 10 may therefore still be opened.

Without extending the range by way of an arrangement described above, a vehicle 10 could for example also be opened and started without authorization if the key with the transponder unit 30 is located within range. This may be the case for example when the vehicle 10 is parked in front of a user's house and the key with the transponder unit 30 is located in the house at a location that is within the range. In such a case, however, it is often not desired to open the vehicle 10.

In order to prevent such attacks and unauthorized opening and starting of the vehicle 10 and to reduce the power consumption of both the transmission unit 20 and the transponder unit 30, there is provision according to the invention that the transmission unit 20 is able to be activated and deactivated. The trans mission unit 20 emits request signals at regular intervals only if it is activated. In the deactivated (inactive) state, the transmission unit 20 does not emit any request signals, such that the transponder unit 30 is not able to be authenticated and the vehicle 10 is not able to be opened or started. That is to say, no request signals that could be transmitted by an arrangement with two devices 40, 50 are emitted. Since the transmission unit 20 does not emit any request signals over relatively long periods of time, the power consumption of the transmission unit 20 and thus of the vehicle 10 is also reduced considerably.

The transponder unit 30 may furthermore also change to a state with reduced power consumption while the transmission unit 20 is deactivated, since no request signals are expected from the transmission unit 20. The transponder unit 30 may for example have a multiplicity of components. These are for example components for receiving signals, components for transmitting signals, components for processing signals and components for determining the position of the transponder unit 30. Various components of the transponder unit 30, for example those that are required in order to receive, process and transmit signals, may be switched off (deactivated) in the state with reduced power consumption. The power consumption in the transponder unit 30 is thereby also reduced considerably. Essentially, only the components for position determination are required, as long as the transponder unit 30 is located outside the first zone ZI. As soon as the transponder unit 30 is detected again in the first zone ZI, all of the components may be activated again.

Figure 3A:
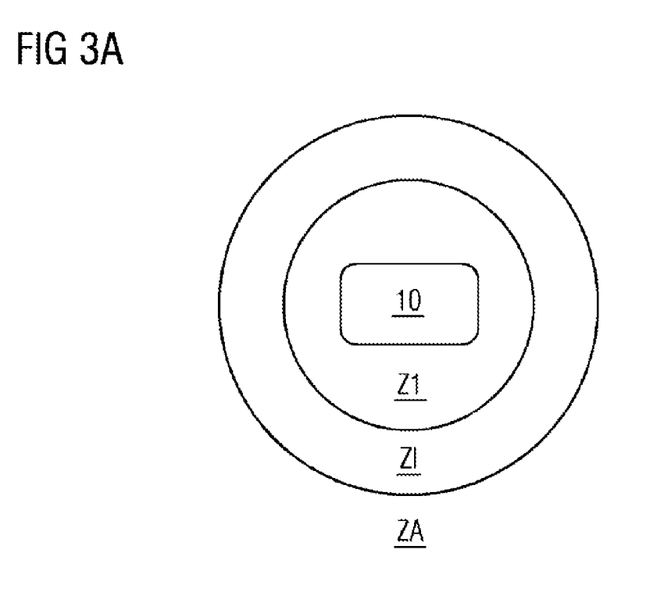
FIGS. 3A and 3B, shows a sketch of a vehicle and various zones in relation to the vehicle.

The transmission unit 20 may be deactivated in response to a triggering event, for example if the transponder unit 30 is located outside a first zone (inner zone) ZI and thus within a second zone (outer zone) ZA. These zones ZI, ZA are illustrated by way of example in FIG. 3A. FIG. 3A shows a vehicle 10 by way of example. The first zone ZI is arranged around the vehicle 10. The first zone ZI may have a circular shape that has a first radius. The center of the first zone is in this case located inside the vehicle. A circular zone is in this case just an example. The first zone ZI may also have for example an oval shape. Other shapes are in principle likewise possible. However, the first zone ZI essentially comprises a short-distance area directly around the vehicle 10.

The second zone ZA adjoins the first zone ZI and comprises the entire long-distance area outside the first zone ZI. The boundary between the first zone ZI and the second zone ZA thus runs at a certain distance around the vehicle 10.

When the vehicle 10 is unlocked, the transponder unit 30 is located in or in the vicinity of the vehicle 10 and thus within the first zone ZI. When the user has parked the vehicle 10, he moves away from the vehicle 10. The transponder unit 30, carried by the user, thus leaves the first zone ZI at a certain time and enters the second zone ZA. The user may either actively lock the vehicle 10 when he moves away from it by pressing a corresponding button on the vehicle key, or the vehicle 10 locks itself independently when it is detected that the transponder unit 30 is located outside a reception zone Z1.

The reception zone Z1 is likewise illustrated in FIG. 3A. The reception zone Z1 is defined by the range of the request signals emitted by the transmission unit 20. As already described above, the request signals have a certain range. Signals in the LF and HF band have for example a range of 5 meters or 10 meters. As long as the transponder unit 30 is located within the reception zone Z1, it is thus able to receive request signals from the transmission unit 20 and the vehicle 10 is not locked unless the user presses the corresponding locking button on the vehicle key. As soon as the transponder unit 30 leaves the reception zone Z1 and no longer receives request signals, it also no longer transmits any response signals back to the transmission unit 20 and the vehicle 10 is automatically locked. The reception zone Z1 is likewise illustrated with a round shape in FIG. 3A. This is however just an example. If several antennas are used to emit request signals, this may also result in any other shape.

Figure 3B:
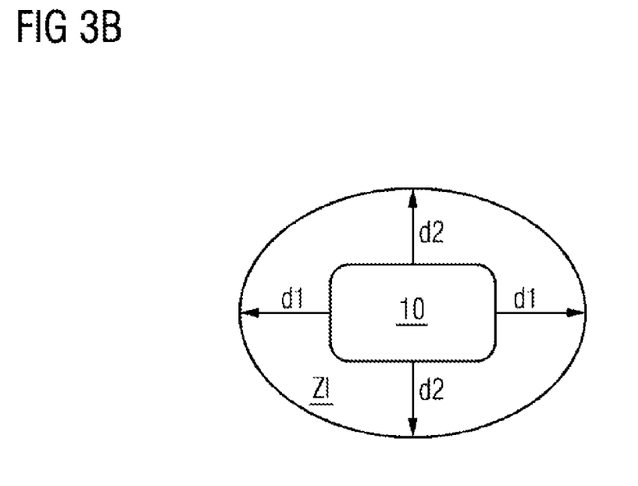

As shown in FIG. 3A, the first zone ZI is for example larger than the reception zone Z1. That is to say, when the transponder unit 30 leaves the reception zone Z1, it is initially still located in the first zone ZI. By way of example, the first zone ZI may have a radius of approximately 15 meters, approximately 19 meters or approximately 25 meters. These are however just examples. For example, if the first zone ZI has an oval shape, then it does not have a uniform radius. The first zone ZI may for example be essentially aligned with the shape of the vehicle 10, such that its boundary to the sides and to the front and rear sides of the vehicle 10 is at approximately a similar distance (d1=d2). This is illustrated by way of example in FIG. 3B. This is also however just an example.

As soon as the vehicle 10 is locked, the transmission unit 20 may for example transmit a first signal to the transponder unit 30. Locking the vehicle is however in this case just an example. The first signal may in principle be transmitted in response to any triggering event. By way of example, the first signal may be transmitted when it has been detected that the last car door has been closed and all of the doors are now closed. In this case, the first signal may be emitted for example only when all of the doors are closed and it is detected at the same time that there is no key in the ignition lock or the vehicle key is not located inside the vehicle and that there are no people located in the vehicle. Any other triggering events are possible.

Figure 4:
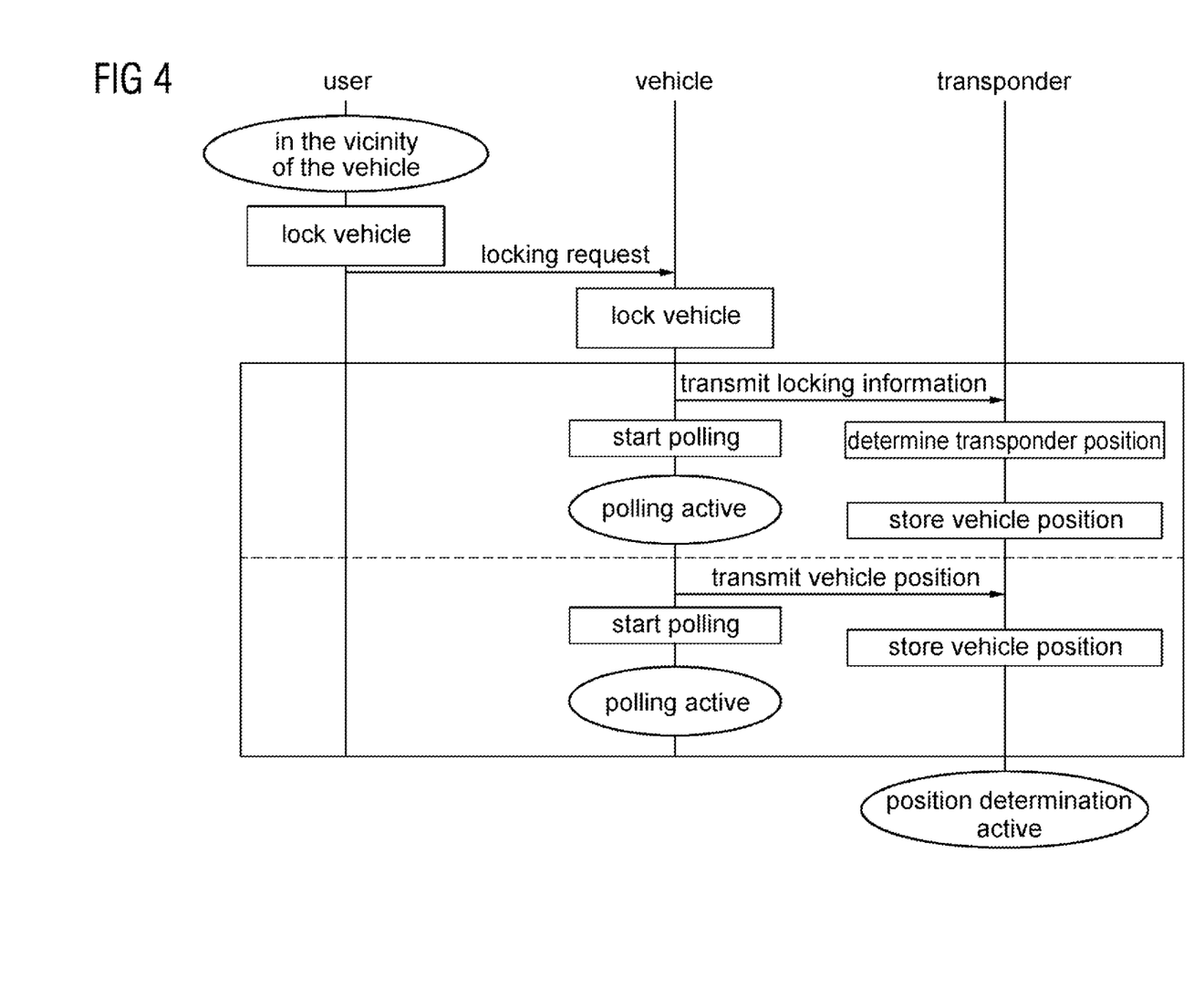
FIG. 4 shows a sequence diagram of exemplary sequences for activating position determination of the transponder unit.

The first signal may in this case be transmitted in such a way that its range is greater than the range of the request signals, such that the transponder unit 30 is able to receive the first signal even if it is no longer located within the reception zone Z1. This process is illustrated by way of example in the sequence diagram in FIG. 4. The first signal may in this case for example contain information about the fact that the vehicle 10 has been locked (transmit locking information). If the transponder unit 30 receives such locking information, it is able to determine its own position. The transponder unit 30 may interpret and store this position as a vehicle position. The position of the vehicle 10 is therefore subsequently known to the transponder unit 30. As an alternative, the first signal may also contain information about the vehicle position (transmit vehicle position). The transponder unit 30 may then store this vehicle position directly. Determination of the position by the transponder unit 30 is dispensed with in this case. This second alternative is also illustrated by way of example in the sequence diagram in FIG. 4. The two alternatives are in this case separated from one another by a dashed line. The steps that are performed outside the box illustrated in FIG. 4 (lock the vehicle) apply to both alternatives.

The transponder unit 30 may be arranged for example in a portable electronic device. The portable electronic device may be for example a mobile telephone, in particular a smartphone, a tablet, laptop or any other portable electronic device that the user may carry. In particular smartphones, but also other electronic devices, are nowadays carried by most users in addition to the vehicle key. Such portable electronic devices generally have a multiplicity of different sensors, for example motion sensors, direction sensors or pressure sensors. The electronic devices may additionally perform various functions, such as for example location determination by way of GPS (Global Positioning System) or location determination by way of wireless networks (Wi-Fi localization). In the case of Wi-Fi localization, the location of the electronic device is determined on the basis of propagation patterns of wireless networks. The current location and the current movement of such electronic devices are therefore nowadays usually easy to determine. Portable electronic devices are also increasingly replacing the vehicle keys known to date. This means that a user no longer additionally has to carry the vehicle key if for example his smartphone assumes this function.

However, it is also possible for the transponder unit 30 to be arranged in a vehicle key and for the vehicle key to have components that allow position determination (for example GPS).

Figure 5:
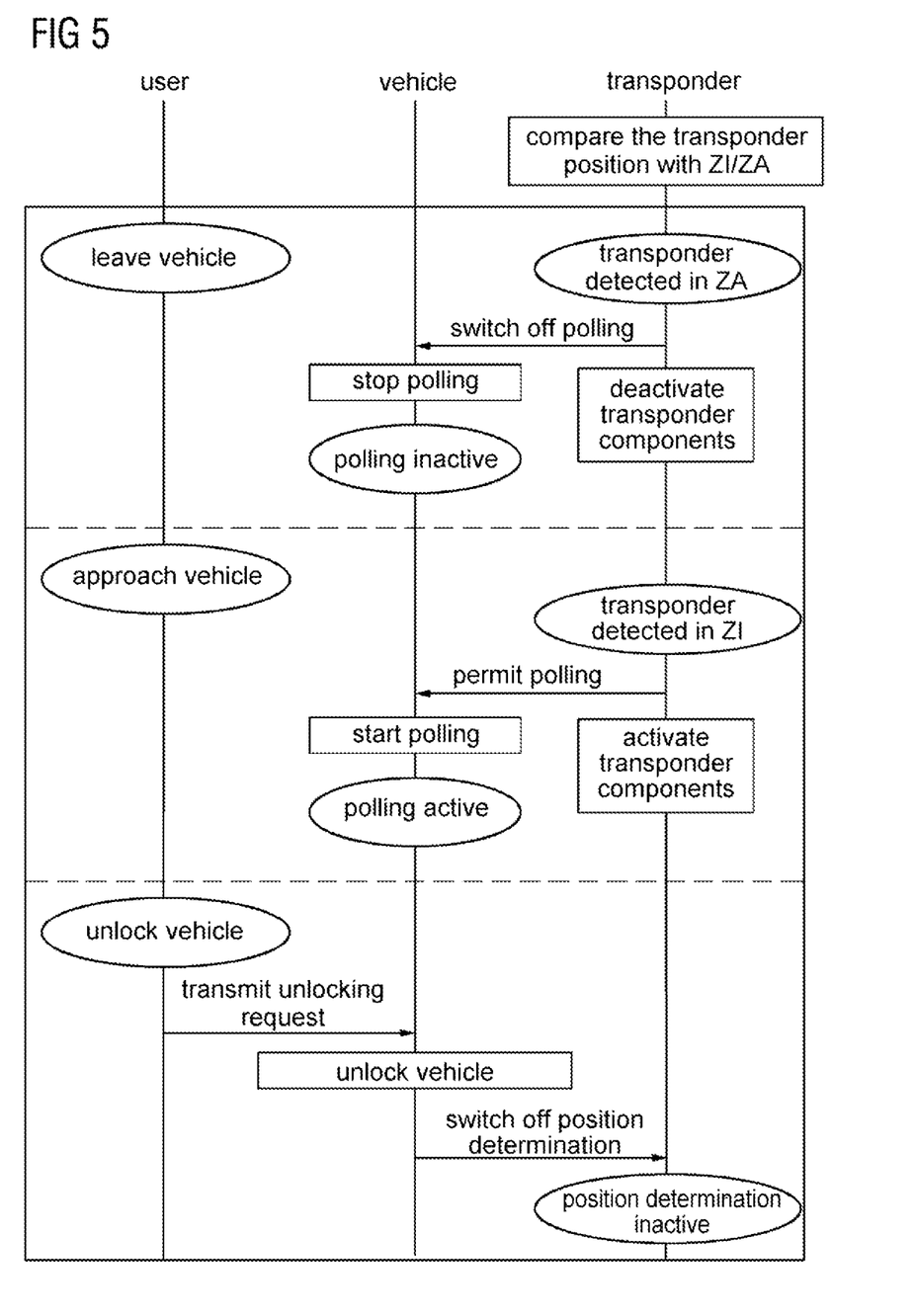
FIG. 5 shows a sequence diagram of exemplary sequences for activating and deactivating polling by the vehicle and for deactivating the position determination of the transponder unit.

After the vehicle position has been stored by the transponder unit 30, the transponder unit 30 determines its own current position at regular intervals. On the basis of the current position of the transponder unit 30, it is possible to determine whether it is located within or outside the first zone ZI. The transponder unit 30 knows the location of the vehicle and the size and shape of the first zone ZI, such that it is easily able to establish whether it is located within or outside the first zone ZI. These processes are illustrated by way of example in the sequence diagram in FIG. 5. FIG. 5 in particular shows various processes that are each illustrated separately from one another by dashed lines. The position determination and the determination as to whether the transponder unit 30 is located within the first zone ZI in this case takes place in all of the illustrated processes and is therefore located outside the box illustrated in FIG. 5.

As long as the transponder unit 30 is still detected within the first zone ZI after the vehicle 10 has been locked (or another triggering event), the transmission unit 20 remains active. That is to say, it emits request signals at regular intervals. This regular emission of request signals is referred to hereinafter as polling. However, if it is detected that the transponder unit 30 leaves the first zone ZI and is therefore now located in the second zone ZA, the transponder unit 30 deactivates the transmission unit 20. For this purpose, the transponder unit 30 may transmit a corresponding deactivation signal (switch off polling) to the transmission unit 20. Upon receiving a deactivation signal, the polling is deactivated, that is to say the transmission unit 20 no longer emits any request signals. At the same time, the transponder unit 30 may deactivate various components in order to reduce its own power consumption, since the transponder unit knows that no request signals are expected.

If the user approaches the vehicle 10 again, the transponder unit 30 leaves the second zone ZA at a particular time and enters the first zone ZI. The transponder unit 30 thus detects that it is again located in the first zone ZI and transmits an activation signal (allow polling) to the transmission unit 20. As soon as the transmission unit 20 receives an activation signal, the polling is reactivated and the transmission unit 20 emits request signals at regular intervals. At the same time, the transponder unit 30 may also reactivate all of the components such that request signals are able to be received and processed again. If the transponder unit 30 approaches the vehicle 10 even further, it ultimately also re-enters the reception zone Z1 and is able to receive the request signals, and the vehicle 10 may be unlocked. As an alternative, the user may also actuate a button on the vehicle key. If the user is located in the vicinity of the vehicle 10, the vehicle 10 may also be unlocked by this active actuation of a button.

When the vehicle 10 is unlocked, the transmission unit 20 may transmit a second signal to the transponder unit 30. Unlocking the vehicle 10 is however in this case just an example. The second signal may in principle be transmitted in response to any triggering event. A further example of a triggering event is the detection that a user is gripping the door handle. Any other triggering events are possible. The transponder unit 30 may be informed of the triggering event for example by way of the second signal. If the transponder unit 30 receives this second signal, it stops determining its own position. As long as the vehicle 10 is unlocked, the transponder unit 30 may assume that it is located within the first zone ZI.

The zones ZI, ZA have been described as fixed (unchanging) zones in the examples described above. That is to say, the zones are defined and the same at all times. By way of example, the zones may be defined by the manufacturer of the vehicle 10 or by the user. However, it is also possible for the zones ZI, ZA to be variable and to adapt dynamically to a situation. That is to say, the shape of the first zone ZI and the distance from the boundary to the vehicle 10 may depend on certain parameters and may thereby adapt to current circumstances. If the transponder unit 30 establishes for example that the position determination is inaccurate, for example poor GPS satellite reception, the first zone ZI may be expanded. That is to say, the transmission unit 20 is deactivated later, or activated earlier. By way of example, in such cases, the first zone ZI may have a radius of more than 50 meters or more than 100 meters.

According to a further example, the transponder unit 30 may establish, on the basis of the current position of the vehicle 10 at the time when the vehicle 10 is locked or at the time of the triggering event, that the user is at home. That is to say, the vehicle 10 is parked in front of the house or in the garage. In this case, the first zone ZI may for example be smaller. That is to say, it may for example have a radius of less than 20 meters, less than 15 meters or less than 10 meters. As a result, what are known as "house door relay attacks", in which a vehicle 10 that has been parked in front of the user's house is stolen by unauthorized people, are able to be prevented more reliably. If the vehicle 10 is recognized for example as being located in a parking lot at the time of locking, the first zone ZI may comprise the entire interior of the parking lot. That is to say, in this case the transmission unit 20 would emit request signals as long as the user is located within the parking lot. If the user leaves the parking lot, and thus the first zone ZI, request signals are no longer transmitted. Many other situations in which the size and shape of the first zone may be adjusted are conceivable.

Figure 6:
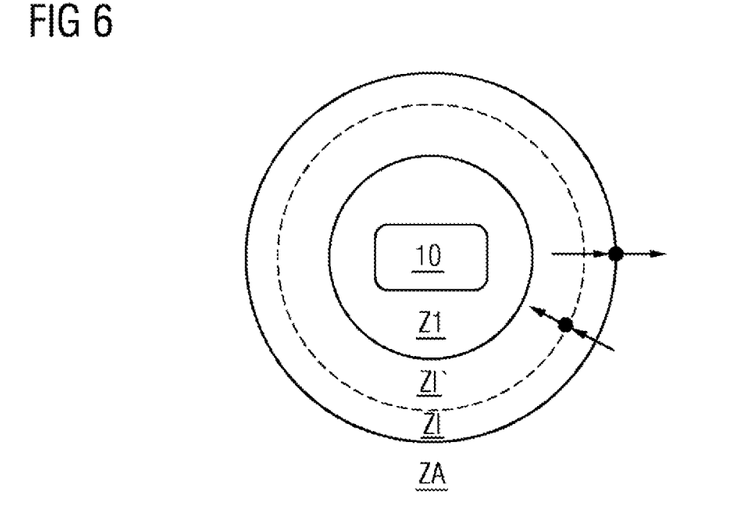
FIG. 6 shows a sketch of a vehicle and various zones in relation to the vehicle.

Furthermore, different zones may in each case be used in the deactivation of the transmission unit 20 and the activation of the transmission unit 20. This is illustrated by way of example in FIG. 6. FIG. 6 shows the vehicle 10 and the reception zone Z1. FIG. 6 furthermore shows the first zone ZI and an adjusted first zone ZI'. By way of example, the transponder unit 30 may emit the deactivation signal (deactivate the transmission unit 20) if it is detected that the transponder unit has left the first zone ZI. The activation signal, on the other hand, may be emitted (activate the transmission unit) if it is detected that the transponder unit 30 has entered the adjusted first zone ZI'. The adjusted first zone ZI' is illustrated with a dashed line in FIG. 6. The adjusted first zone ZI' may for example be smaller than the first zone ZI. In this case, a distance between the outer boundary of the first zone ZI and the vehicle 10 is for example greater than a distance between the outer boundary of the adjusted first boundary ZI' and the vehicle 10. This may for example prevent the transmission unit 20 from being deactivated and reactivated multiple times in quick succession when the user is located in the boundary area between the first zone ZI and the second zone ZA. In this case, the transmission unit 20 is reactivated only when the transponder unit 30 has again moved significantly closer to the vehicle 10 and is located within the adjusted first zone ZI'.

An adjusted first zone ZI' is not illustrated in the example illustrated in FIG. 3. It may be assumed in this case that the first zone ZI and the adjusted first zone ZI' are identical. That is to say, an outer boundary of the first zone ZI is at the same distance from the vehicle 10 as the outer boundary of the adjusted first zone ZI'. The adjusted first zone ZI' may, as described above with reference to the first zone ZI, be variable and adapt to the respective situation.

Different (adjusted) zones ZI, ZI' may for example be created by using different radio frequencies or communication connections. By way of example, the deactivation signal may be transmitted at a first frequency and the activation signal at a second frequency. By way of example, the communication for deactivating the transmission unit 20 (deactivation signal) may take place by way of LF signals, whereas the communication for activating the transmission unit 20 (activation signal) takes place by way of Bluetooth or Bluetooth Low Energy (BLE).

Bluetooth is an internationally standardized data interface. Bluetooth may be used to interchange data or files between two devices or to transmit music and voice, for example. Bluetooth devices in this case transmit at a frequency of 2.4 GHz and allow data transmission at a short range of normally less than 50 m. At present, various Bluetooth standards are known, for example Bluetooth 1.0 and 1.0B 1999, Bluetooth 2.0+EDR 2004 or Blue-tooth 4.0 2009. The standard according to which the transponder unit 30 and the transmission unit 20 communicate with one another is in this case not important in the present invention. In order to allow communication, however, it is generally a requirement for two Bluetooth-compatible devices between which a connection is to be set up to communicate using the same standard. Some of the standards are however also compatible with one another.

Bluetooth devices generally consume a relatively large amount of power. The power consumption is however usually critical especially in vehicles or the associated transponder units (vehicle keys), as described above. Therefore, what are known as Bluetooth Low Energy (BLE) devices are found increasingly frequently in vehicles and external devices and transponder units. Bluetooth Low Energy is often also referred to as Bluetooth Smart. BLE is based on conventional Bluetooth technology, but has significantly lower power consumption and is generally less expensive. When using BLE devices in a transponder unit 30, the battery of the transponder unit 30 (or of the vehicle key or portable electronic device) is thus loaded less than with conventional Bluetooth devices.

LF signals and Bluetooth or Bluetooth Low Energy are however just examples. Various other communication connections and corresponding frequencies may be used to implement the (adjusted) zones ZI, ZI'. Further examples of communication connections are RF signals (also referred to as radiofrequency, HF), Internet connections, connections via a cloud, or the like.

It has been assumed in the examples described above that in each case only one transponder unit 30 is located in the vicinity of the vehicle 10. In principle, however, a vehicle 10 usually has several valid vehicle keys and thus transponder units 30. By way of example, a married couple may have joint use of the vehicle 10. Each of the two spouses may in this case carry a vehicle key (transponder unit 30). If both drive together with the vehicle 10, the transmission unit 20 may for example be deactivated only when both transponder units 30 have left the first zone ZI. Since both transponder units 30 each transmit corresponding deactivation signals and activation signals when they leave or enter the first zone ZI, the transmission unit 20 always knows how many transponder units 30 are currently located within the first zone ZI. The transmission unit 20 is in this case activated as soon as a transponder unit 30 is located within the first zone ZI and has emitted an activation signal to the transmission unit 20. If further transponder units 30 enter the first zone ZI, nothing happens. Although these each likewise emit an activation signal, they are ignored by the transmission unit 20 since it is already activated.

The transmission unit may in principle also be deactivated (transmit the deactivation signal) in response to any triggering event. The triggering event may in this case be that the transponder unit 30 leaves the first zone ZI (and the adjusted first zone ZI'). The deactivation signal could furthermore also be emitted for example when the transponder unit 30 is located outside the reception zone Z1 but within the first zone ZI, and it is detected at the same time that the transponder unit 30 is no longer moving. A duration may for example be defined. If the transponder unit 30 has not moved for at least this duration, the transmission unit 20 may be deactivated. The transmission unit 20 may be reactivated when movement of the transponder unit 30 has been detected again. This may for example be detected by way of appropriate sensors, for example motion sensors. A further possibility is to deactivate the transmission unit 20 if the transponder unit 30 is still located within the reception zone Z1 but the connection to the vehicle 10 breaks off, for example if there is a wall between the vehicle 10 and the transponder unit 30. Any combination of said triggering events is likewise possible. Any other triggering events and combinations of events that are not described are additionally also possible.

Figure 7:
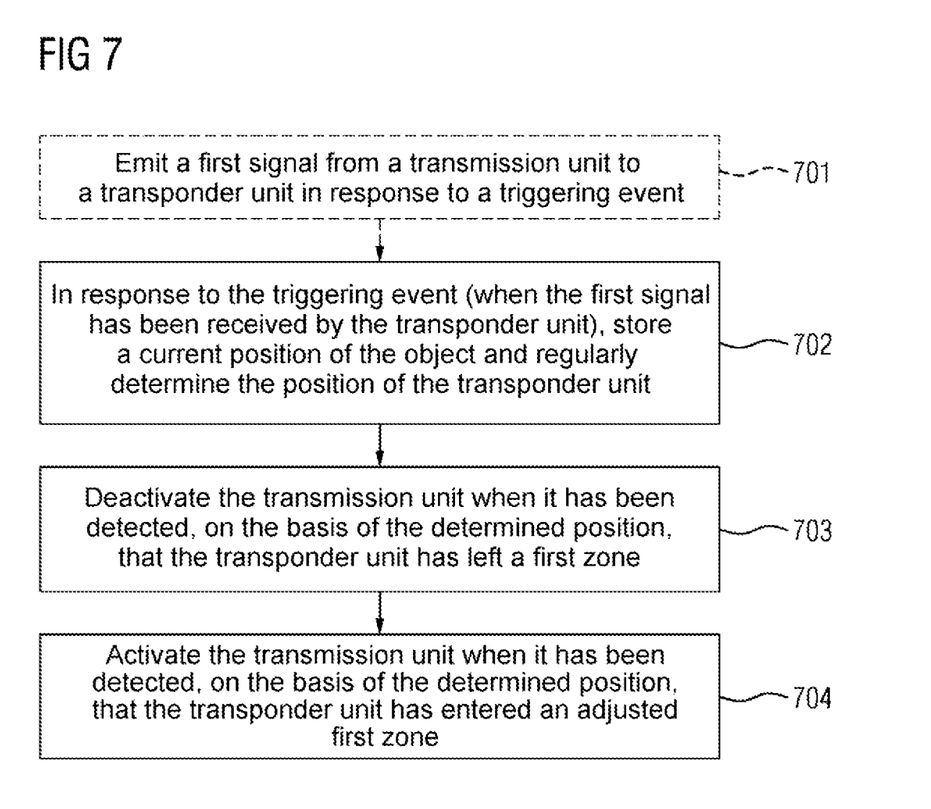
FIG. 7 shows a flowchart of an access and starting verification method according to one embodiment of the invention.

FIG. 7 uses a flowchart to schematically illustrate an access verification method. In response to a triggering event, a current position of an object 10 is stored and the position of a transponder unit 30 is determined at regular intervals (step 702). A transmission unit 20 arranged in the object is deactivated when it has been detected, on the basis of the determined position, that the transponder unit 30 has left a first zone ZI (step 703), wherein the first zone ZI is arranged around the object 10, and wherein the transmission unit 20 does not emit any request signals while it is deactivated. The transmission unit 20 is activated when it has been detected, on the basis of the determined position, that the transponder unit 30 has entered an adjusted first zone ZI' (step 704), wherein the adjusted first zone ZI' is arranged around the object 10, and wherein the transmission unit 20 emits request signals at regular intervals while it is activated.

In a preceding step, a first signal may optionally be emitted from the transmission unit 20 to the transponder unit 30 (step 701). The current position of the object 10 may be stored and the position of the transponder unit 30 may be determined at regular intervals when the first signal has been received by the transponder unit 30 and said transponder unit has thus been informed about the triggering event.

The invention has been described using the example of a vehicle 10. The invention may however be used not only in vehicles 10 but in any kind of object (for example front doors, garage doors, etc.) that are able to be locked or unlocked by way of a transponder unit 30. A vehicle 10 may for example be a passenger vehicle. A vehicle 10 may however also for example be a truck, bus, tractor, aircraft, boat or the like.

LIST OF REFERENCE SIGNS 10 vehicle
20 transmission unit
30 transponder unit
40 first device
50 second device
Z1 reception zone
ZI first zone
ZI' adjusted first zone
ZA second zone

The invention claimed is:

1. An access system comprising:
a transmission unit arranged in an object, and
a transponder unit arranged in a portable device, wherein
the transmission unit is configured to emit request signals at regular intervals in an active state;
the transponder unit is configured, in response to a triggering event, to store a current position of the object and to determine the transponder unit's own position at regular intervals;
the transponder unit is further configured to deactivate the transmission unit when the transponder unit detects, based on the determined position, that the transponder unit has left a first zone, wherein the first zone is arranged around the object, and wherein the transmission unit does not emit any request signals while the transmission unit is deactivated; and
the transponder unit is further configured to activate the transmission unit when the transponder unit detects, based on the determined position, that the transponder unit has entered an adjusted first zone, wherein the adjusted first zone is arranged around the object.

2. The access system as claimed in claim 1, wherein the transmission unit is configured to transmit a first signal to the transponder unit in the active state in response to a first triggering event; and
the transponder unit stores the current position of the object and determines the transponder unit's own position at regular intervals when the transponder unit receives the first signal from the transmission unit.

3. The access system as claimed in claim 1, wherein a first triggering event comprises at least one of:
locking the object;
detecting that all doors of the object are closed; and
detecting that there are no people inside the object.

4. The access system as claimed in claim 1, wherein the transponder unit is further configured, if transponder unit is located within a reception zone, to receive request signals from the transmission unit, to process the request signals and to emit response signals to the transmission unit, wherein the reception zone is arranged around the object and is determined by the range of the request signals.

5. The access system as claimed in claim 1, wherein
the transmission unit, when the transmission unit has been reactivated, is further configured to emit a second signal to the transponder unit in response to a second triggering event; and
the transponder unit is further configured to stop determining position when the transponder unit receives the second signal from the transmission unit.

6. The access system as claimed in claim 1, wherein
an outer boundary of the first zone has a first distance to the object; and
an outer boundary of the adjusted first zone has a second distance to the object.

7. The access system as claimed in claim 6, wherein
the first distance is greater than the second distance, or the first distance and the second distance are the same.

8. The access system as claimed in claim 1, wherein a shape and a size of the first zone and of the adjusted first zone are variable and depend on at least one parameter.

9. The access system as claimed in claim 8, wherein the shape and size of the first zone and of the adjusted first zone depend on at least one of
accuracy of determining position by the transponder unit; and
a current position of the object.

10. The access system as claimed in claim 1, wherein the transponder unit has a plurality of components and the transponder unit is further configured
to deactivate at least some of the components if the transponder unit detects, based on the determined position, that the transponder unit has left the first zone; and
to reactivate the components if the transponder unit detects, based on the determined position, that the transponder unit has entered the adjusted first zone.

11. The access system as claimed in claim 1,
wherein the transponder unit is configured to determine position of the object when the transponder unit receives a first signal from the transmission unit; or
wherein the first signal contains information about the position of the object.

12. An access verification method comprising:
in response to a first triggering event, storing a current position of an object and regularly determining the position of a transponder unit arranged in a portable device;
deactivating a transmission unit arranged in the object if, based on the determined position, the transponder unit has been detected to have left a first zone, wherein the first zone is arranged around the object, and wherein the transmission unit does not emit any request signals while the transmission unit is deactivated;
activating the transmission unit if, based on the determined position, the transponder unit has been detected to have entered an adjusted first zone, wherein the adjusted first zone is arranged around the object, and wherein the transmission unit emits request signals at regular intervals while the transmission unit is activated.

13. The method as claimed in claim 12 further comprising:
in response to the first triggering event, emitting a first signal from the transmission unit to the transponder unit,
wherein the current position of the object is stored and the position of the transponder unit is determined regularly when the first signal has been received by the transponder unit.

14. The method as claimed in claim 12, further comprising:
detecting movement of the transponder unit;
deactivating the transmission unit if the transponder unit has been detected to have not moved for a predefined duration, regardless of whether the transponder unit is detected within or outside the first zone; and
activating the transmission unit if the transponder unit has been detected to have moved again.

15. A vehicle comprising:
an access system, wherein the access system comprises a transmission unit arranged in the vehicle and a transponder unit arranged in a portable device, wherein
the transmission unit is configured to emit request signals at regular intervals in an active state;
the transponder unit is configured, in response to a triggering event, to store current position of the vehicle and to determine the transponder unit's own position at regular intervals;
the transponder unit is further configured to deactivate the transmission unit when the transponder unit detects, based on the determined position, that the transponder unit has left a first zone, wherein the first zone is arranged around the vehicle, and wherein the transmission unit does not emit any request signals while the transmission unit is deactivated;
the transponder unit is further configured to activate the transmission unit when the transponder unit detects, based on the determined position, that the transponder unit has entered an adjusted first zone, wherein the adjusted first zone is arranged around the vehicle.

* * * * *